No. 647,008. Patented Apr. 10, 1900.
G. MARCONI.
APPARATUS EMPLOYED IN WIRELESS TELEGRAPHY.
(Application filed Dec. 26, 1899.)

(No Model.) 2 Sheets—Sheet 1.

No. 647,008. Patented Apr. 10, 1900.
G. MARCONI.
APPARATUS EMPLOYED IN WIRELESS TELEGRAPHY.
(Application filed Dec. 26, 1899.)
(No Model.) 2 Sheets—Sheet 2.

UNITED STATES PATENT OFFICE.

GUGLIELMO MARCONI, OF LONDON, ENGLAND, ASSIGNOR TO THE WIRELESS TELEGRAPH AND SIGNAL COMPANY, LIMITED, OF SAME PLACE.

APPARATUS EMPLOYED IN WIRELESS TELEGRAPHY.

SPECIFICATION forming part of Letters Patent No. 647,008, dated April 10, 1900.

Original application filed June 13, 1899, Serial No. 720,355. Divided and this application filed December 26, 1899. Serial No. 741,613. (No model.)

*To all whom it may concern:*

Be it known that I, GUGLIELMO MARCONI, electrician, a subject of the King of Italy, residing at 28 Mark Lane, in the city of London, England, have invented certain new and useful Apparatus Employed in Wireless Telegraphy, of which the following is a specification.

This invention relates to improvements in the apparatus described in Letters Patent of the United States No. 627,650, granted to me June 27, 1899. In that specification I described connecting the aerial conductor to a capacity, which may be the earth, through the primary of an induction-coil, the ends of the imperfect contact or sensitive tube being connected to the ends of the secondary. In place of winding both the primary and secondary in single layers, as claimed in that specification, the coils are now either made very short (not much exceeding two centimeters in length) or else are wound in sections. The number of turns in the successive layers of the secondary (and sometimes of the primary also) should diminish as the distance from the center increases. It is also found desirable to connect direct to the sensitive tube or imperfect contact (not through the condenser) the end of the secondary which is farthest away from the nucleus or axial line of the coil.

Figure 1:
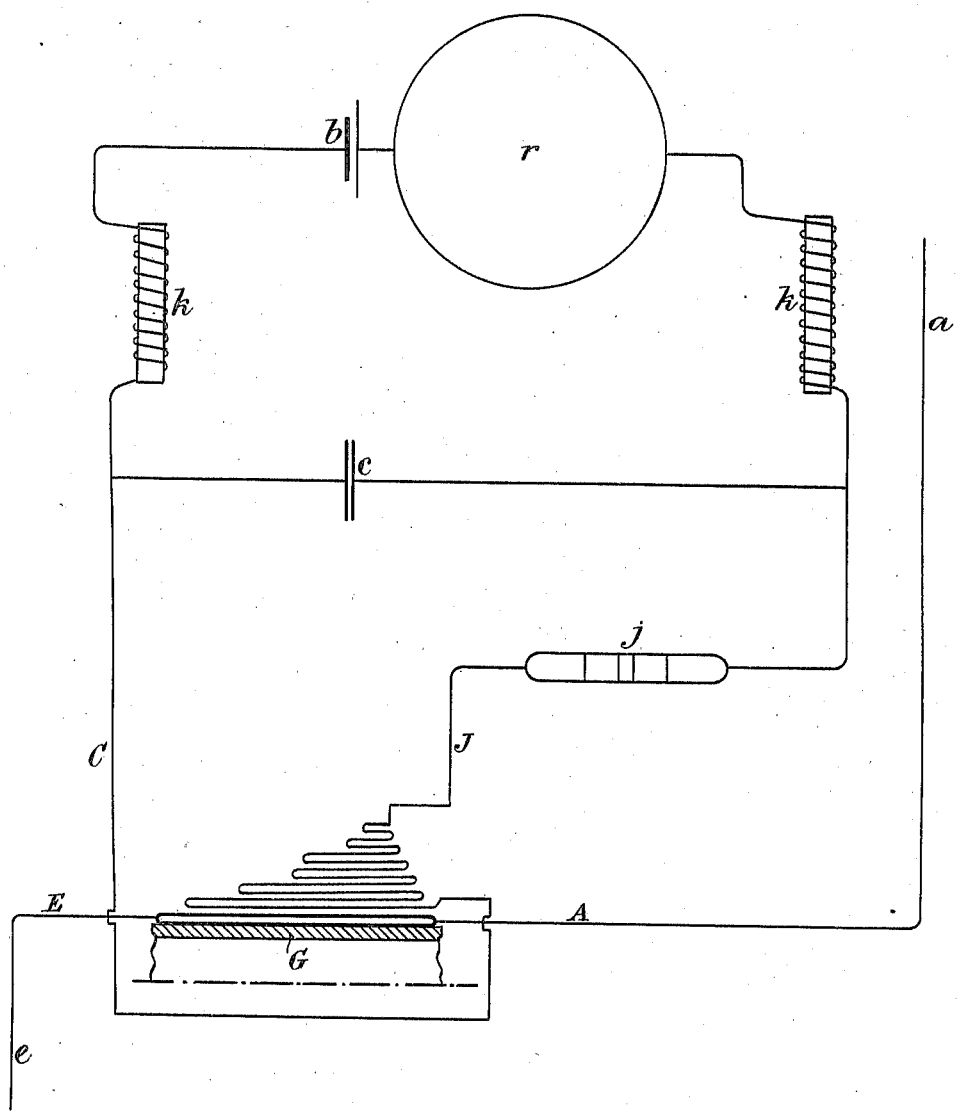
Figure 2:
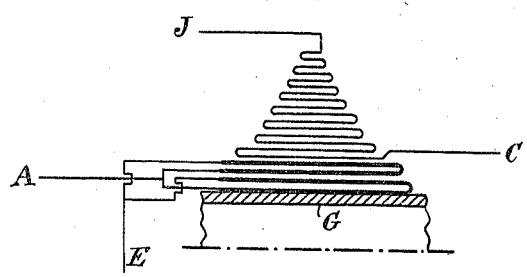
Figure 3:
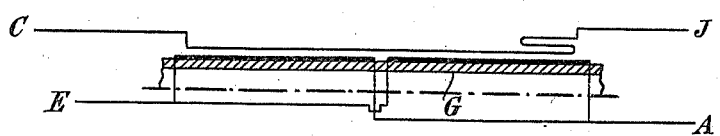

Figure 1 is a diagram of the arrangement described in the former specification, modified in accordance with the present invention; and Figs. 2 and 3 show modified forms of the induction-coil.

In Fig. 1, $a$ is the aerial conductor; $b$, a local battery; $c$, a condenser; $e$, a connection to earth or other suitable capacity; $j$, a sensitive tube or imperfect contact; $k$, choking coils, and $r$ a relay working a signaling or other instrument. The diagrams of the coils are greatly-enlarged half-longitudinal sections, but are not strictly to scale. In place also of showing the section of each coil or layer of wire as a longitudinal row of dots or small circles, as it would actually appear, it is for simplicity shown as a single continuous longitudinal straight line. A is the end of the primary which is connected to the aerial conductor $a$, and E is the end connected to earth or a capacity. J is the end of the secondary which is directly connected to the sensitive tube or imperfect contact $j$, and C is the end which is connected to it through the condenser. G is a glass tube on which the coils are wound. The wires are preferably insulated by a single covering of silk.

The following table gives particulars of coils which have been successfully used:

| Figure in drawings. | Diameter of tube G, in centimeters. | Diameter of wires, in centimeters. | | Resistance, in ohms. | | Number of turns in windings. | | Length, in centimeters. |
|---|---|---|---|---|---|---|---|---|
| | | Primary. | Secondary. | Primary. | Secondary. | Primary | Secondary. | |
| Fig. 1 | .975 | .012 | .012 | | | 2 layers of 110 each, in parallel | 12 layers of 100 80 75 60 50 45 40 28 20 15 10 5 turns. | 1.8 |

| Figure in drawings. | Diameter of tube G, in centimeters | Diameter of wires, in centimeters. | | Resistance, in ohms. | | Number of turns in windings. | | Length, in centimeters. |
|---|---|---|---|---|---|---|---|---|
| | | Primary. | Secondary. | Primary. | Secondary. | Primary. | Secondary. | |
| Fig. 2 | .975 | .012 | .012 | ........ | ........ | 4 layers, 80 turns, 78 turns, } in series. 70 turns, 72 turns, } in series. | 16 layers of 60, 54, 46, 42, 40, 36, 32, 29, 26, 23, 20, 18, 14, 12, 9, 7 turns. | 1.5 |
| Fig. 3 | .975 | .012 | .012 | 5.75 | 28.5 | 1 layer of 2 wires in parallel, with 100 turns each, wound tandem. | 3 layers of 310, 45, 45 turns ........... | 5.8 |

The coils are wound in the following manner:

In Fig. 1, G is a glass tube and on it is wound the primary in two layers, there being one hundred and ten turns in each layer. The ends of these two coils or layers are connected in parallel, one to the aerial conductor and the other to earth. On the outer coil of the primary is wound the first or inner coil of the secondary, which is continuous and has one hundred turns. The secondary is in a single section, and the second and succeeding layers have eighty, seventy-five, sixty, fifty, forty-five, forty, twenty-eight, twenty, fifteen, ten, and five turns, respectively, the wire from the inner layer (that with one hundred turns) being connected to the left-hand side of the condenser $c$, and the left-hand choking-coil $k$ and the wire from the outer layer (that with five turns) being connected directly to the left-hand end of the sensitive tube $j$. The slope at the right-hand side of the coil is made steeper than on the left-hand side.

In Fig. 2 the primary is wound on the glass tube G in four layers, the inner layer having eighty turns. The right-hand end of the wire forming the inner layer is wound on that layer, forming the second layer, which has seventy-eight turns. The left-hand end of the wire forming the inner layer is wound on the second layer, forming the third layer, which has seventy-six turns. The right-hand end of the wire forming the third layer is wound on that layer, forming the fourth layer, which has seventy-two turns. The left-hand ends of the wires forming the inner and third layers are connected to the aerial conductor, and the left-hand ends of the wires forming the second and fourth layers are connected to earth. The secondary is wound on the outer or fourth layer of the primary, and consists of 16 layers, having sixty, fifty-four, forty-six, forty-two, forty, thirty-six, thirty-two, twenty-nine, twenty-six, twenty-three, twenty, eighteen, fourteen, twelve, nine, and seven turns, respectively, the end of the wire from the inner layer (that with sixty turns) being connected to the left-hand side of the condenser $c$ and the left-hand choking-coil $k$ and the end of the wire from the outer layer (that with seven turns) being connected directly to the left-hand end of the sensitive tube $j$.

In Fig. 3 the primary consists of a single layer formed of two wires, each having one hundred and sixty turns around the tube G, their right-hand ends being connected to the aerial conductor and their left-hand ends to earth. The secondary has three layers, the inner one having three hundred and ten turns and the second and third forty-five turns each, these being wound on the right-hand end of the inner layer. The left-hand end of the inner layer is connected to the left-hand side of the condenser $c$ and the left-hand choking-coil $k$, the end of the outer layer being connected directly to the left-hand end of the sensitive tube $j$.

The method in which the sections of the coil are connected is found to be important.

This application is a division of my application filed June 13, 1899, Serial No. 720,355, wherein are made claims covering generically the subject-matter specifically claimed herein.

I claim—

1. In a receiver for electrical oscillations, the combination of an imperfect electrical contact, a local circuit through it, an induction-coil, the secondary of which consists of several layers, the number of turns in the outer layers being less than in those next the primary, a capacity connected to one end of the primary, a conductor connected to the other end, connections between the ends of the imperfect contact and the ends of the secondary, and a condenser in the connection to the inner end of the secondary.

2. In a receiver for electrical oscillations, the combination of an imperfect electrical contact, a local circuit through it, an induction-coil, the secondary of which consists of several layers, the number of turns in the outer layers being less than in those next the primary and wound unsymmetrically with a lump at one end, a capacity connected to one end of the primary, a conductor connected to the other end, connections between the ends of the imperfect contact and the ends of the secondary, and a condenser in the connection to the inner end of the secondary.

3. In a receiver for electrical oscillations, the combination of an imperfect electrical contact, a local circuit through it, an induction-coil, the primary of which consists of two wires connected in parallel wound in two layers, the secondary of which consists of several layers, the number of turns in the outer layers being less than in those next the primary, a capacity connected to one end of the primary, a conductor connected to the other end, connections between the ends of the imperfect contact and the ends of the secondary, and a condenser in the connection to the inner end of the secondary.

4. In a receiver for electrical oscillations, the combination of an imperfect electrical contact, a local circuit through it, an induction-coil, the primary of which consists of two wires connected in parallel wound in two layers, the secondary of which consists of several layers, the number of turns in the outer layers being less than in those next the primary and wound unsymmetrically with a lump at one end, a capacity connected to one end of the primary, a conductor connected to the other end, connections between the ends of the imperfect contact and the ends of the secondary, and a condenser in the connection to the inner end of the secondary.

GUGLIELMO MARCONI.

Witnesses:
 J. ERSKINE-MURRAY,
 R. B. RANSFORD.